Aug. 24, 1948.   W. R. DRESSER   2,447,847
COMPENSATED STEP-BY-STEP MECHANISM
Filed Oct. 3, 1946   3 Sheets-Sheet 1

INVENTOR.
Willis Robert Dresser
BY
ATTORNEY.

Aug. 24, 1948.   W. R. DRESSER   2,447,847
COMPENSATED STEP-BY-STEP MECHANISM
Filed Oct. 3, 1946   3 Sheets-Sheet 2

INVENTOR.
Willis Robert Dresser
BY
ATTORNEY.

Aug. 24, 1948.  W. R. DRESSER  2,447,847
COMPENSATED STEP-BY-STEP MECHANISM
Filed Oct. 3, 1946  3 Sheets-Sheet 3
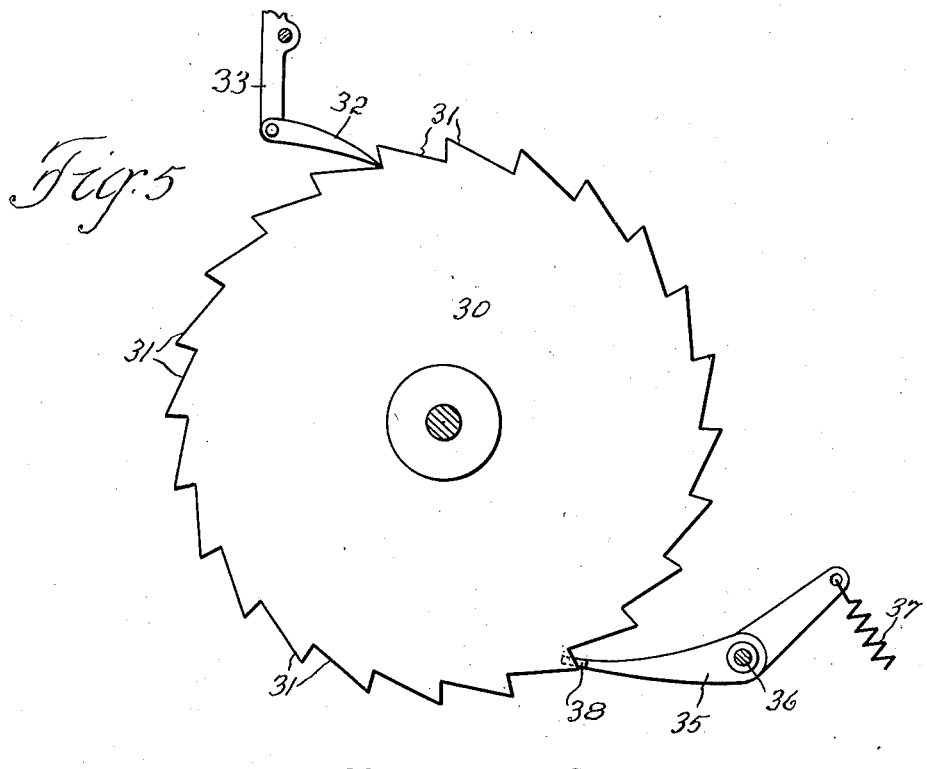
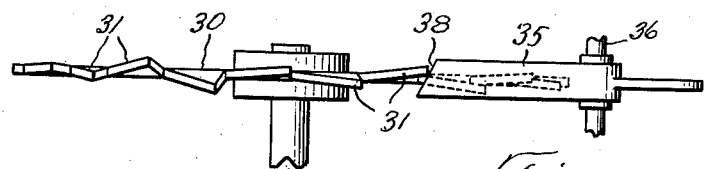
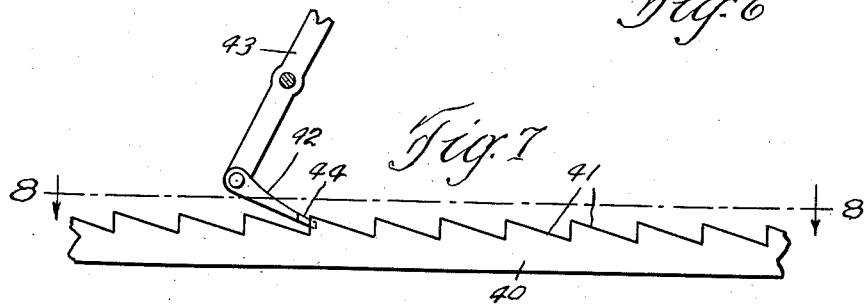
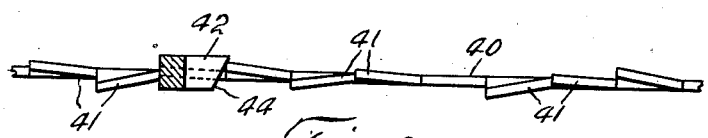
INVENTOR.
Willis Robert Dresser
BY
ATTORNEY.

Patented Aug. 24, 1948

2,447,847

UNITED STATES PATENT OFFICE 2,447,847

COMPENSATED STEP-BY-STEP MECHANISM

Willis Robert Dresser, Long Hill, Conn.

Application October 3, 1946, Serial No. 700,895

3 Claims. (Cl. 74—575)

This invention relates to an adjustable step-by-step mechanism and has for an object to provide a mechanism of this type which is readily adjustable to compensate for non-uniform calibration.

The invention is particularly applicable to a scanning apparatus for determining the reading of an instrument, such as a thermometer, barometer, water level gauge, or the like, although it may be used in various instances where step-by-step movements of adjustable calibration are required.

This application is a continuation-in-part of my co-pending application Serial No. 520,815 filed February 2, 1944, for Remote control system now Patent Number 2,419,487.

Although the novel features which are characteristic of this invention are set forth more in detail in the claims appended hereto, the nature and scope of the invention may be better understood by referring to the following description, taken in connection with the accompanying drawings forming a part thereof in which certain specific embodiments have been set forth for purposes of illustration.

In the drawings:

Fig. 5 is a detail view of a pawl driven toothed wheel illustrating a further embodiment of the invention;

Fig. 6 is a side elevation of the mechanism of Fig. 5;

Fig. 7 is a detail view of a pawl driven rack embodying the invention; and

Fig. 8 is a section taken along the line 8—8 of Fig. 7.

Figure 1:
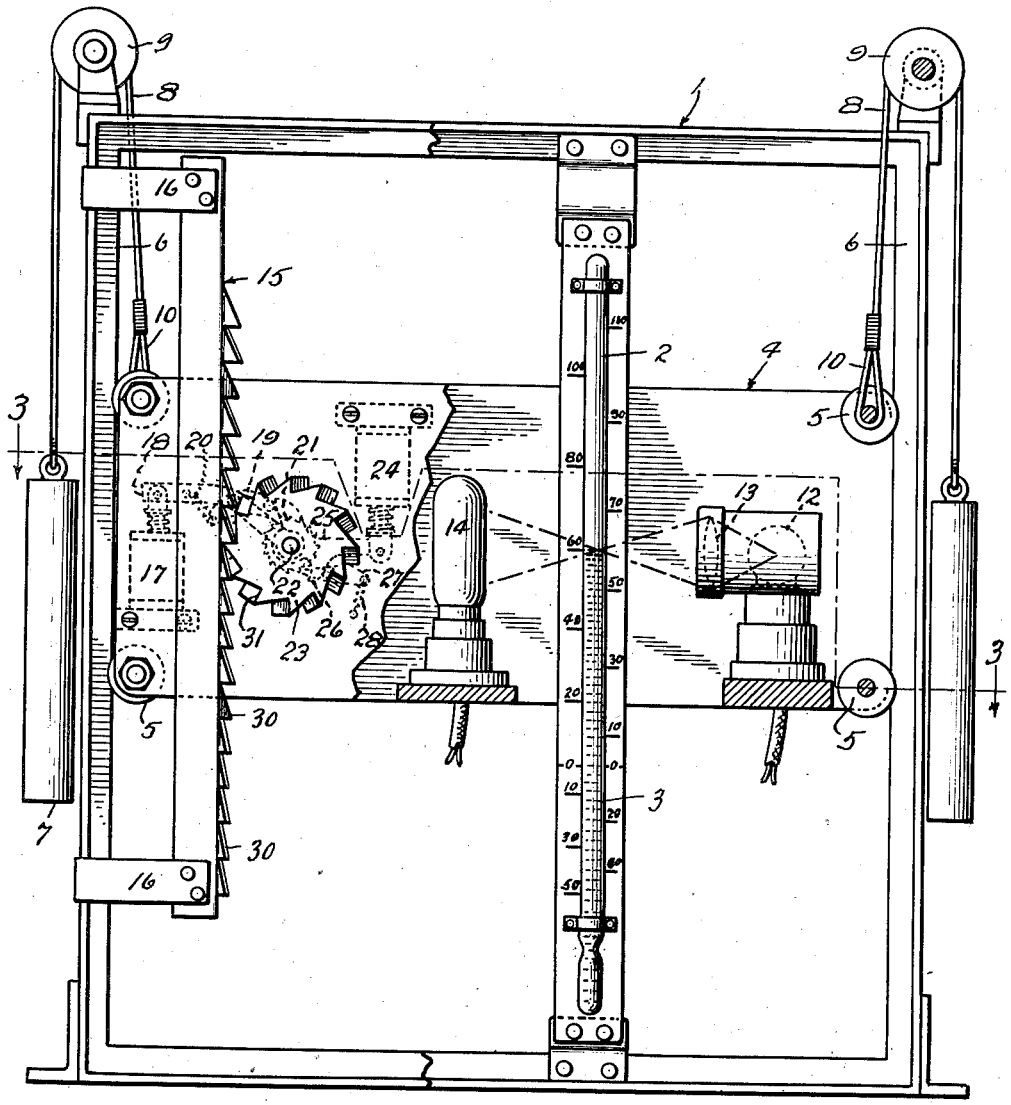
Fig. 1 is a side view of an instrument panel including a thermometer and a vertically movable carriage containing the scanning and associated apparatus.
Figure 2:
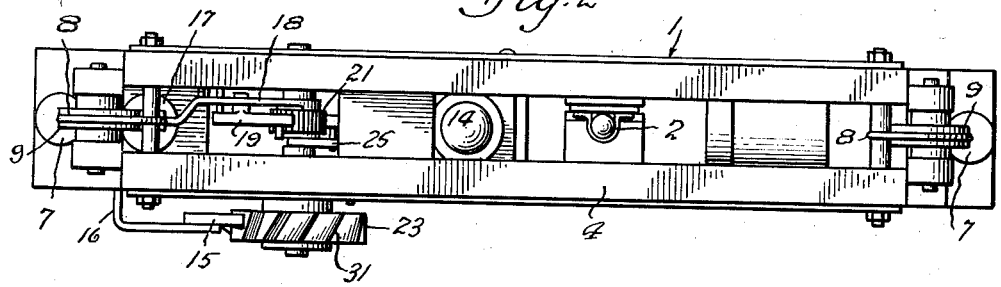
Fig. 2 is a top plan view of the apparatus shown in Fig. 1.

In the following description certain specific terms are used for convenience in referring to the various details of the invention. These terms, however, are to be interpreted as broadly as the state of the art will permit.

In the drawings, the invention is shown in Figs. 1 to 4 as incorporated in an instrument box or panel 1 containing an upright thermometer 2 of standard construction having the usual mercury or other fluid column 3.

Figure 3:
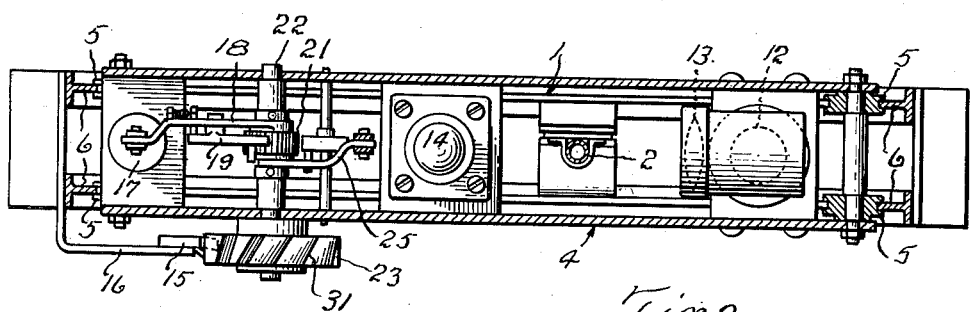
Fig. 3 is a transverse section taken on the line 3—3 of Fig. 1.

The apparatus for scanning thermometer 2 is mounted on a vertically movable carriage 4 having rollers 5 which run on vertical tracks 6 secured to opposite sides of the instrument panel 1, as shown in Figs. 1 and 3.

Suitable counterweights 7 are secured to cords 8 which pass over pulleys 9 on the top of panel 1 and are tied to the vertically movable carriage 4 by loops 10, as shown in Fig. 1. When the carriage 4 is released by a locking device hereinafter described, and permitted to ride freely on its tracks 6, the counterweights 7 will descend and thereby raise the carriage to the top of the panel 1.

The scanning apparatus mounted on carriage 4 includes an exciter lamp 12 and lens 13 on one side of thermometer 2, and a photoelectric cell 14 mounted on the opposite side of said thermometer. The lens 13 focuses the rays from lamp 12 at a point on the mercury column 3 of thermometer 2, and when the mercury is in the path of said rays the photoelectric cell 14 is inoperative. However, when the rays from lamp 12 are focused at a point on the thermometer above the column of mercury, the light will strike the photoelectric cell and render it conductive.

The scanning operation always starts with the carriage 4 at the top of panel 1, and the thermometer employed at the sub-station is always such that the mercury will never rise high enough to obstruct the rays from lamp 12 when the carriage is at its uppermost starting position.

The mechanism for actuating the carriage 4 includes a vertical toothed rack 15 secured by brackets 16 to the panel 1; a stepping solenoid or magnet 17 mounted on carriage 4 and having an armature lever 18 carrying a pivoted stepping pawl 19 which is normally held by spring 20 in engagement with the teeth of a pinion 21 on shaft 22 journaled in carriage 4; a star wheel or sprocket 23 keyed to shaft 22 and engaging the teeth of stationary rack 15; a release solenoid or magnet 24 having an armature lever 25 adapted to disengage pawl 10 from pinion 21, and an extension 26 of said lever 25 adapted to trip a locking pawl 27 which is normally held by spring 28 in engagement with the teeth of pinion 21.

Accordingly, each time the stepping magnet 17 is energized it actuates its armature lever 18, causing the pawl 19 to rotate the pinion 21 one step and thereby rotating the sprocket 23 and lowering the carriage 4 a distance of one measured increment. This increment may be equal to one degree on the scale of thermometer 2. When the release magnet 24 is energized it actuates its armature lever 25, thereby disengaging stepping pawl 19 and locking pawl 27 from pinion 21 and permitting the counterweights 7 to descend and thus raise the carriage 4 to the top of panel 1.

In the embodiment illustrated in Figs. 1 to 4 the teeth of rack 15 are equidistant, as are also the teeth of sprocket 23. However, the calibrations of thermometer 2 are not all uniformly spaced, and this same condition may also prevail in other types of meters or gauges employed in a system of this kind. In the preferred form of the invention this non-uniformity in the calibrations of thermometer 2 is compensated or corrected by cutting or forming the teeth of sprocket 23 at a slant or diagonally on the edge instead of straight across the edge of the sprocket, and by bending the teeth of rack 15 when necessary to make them engage the slanting teeth of the sprocket at certain points which will be determined by the spacing of the calibrations on the thermometer.

Figure 4:
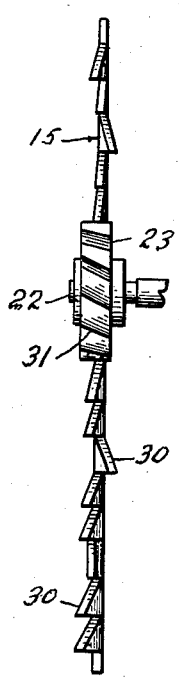
Fig. 4 is a fragmentary view of the toothed rack forming a part of the carriage-moving apparatus of Fig. 1.

Thus in Figs. 1 and 4 certain teeth 30 of the rack 15 are bent sideways out of the flat vertical plane of the rack, in a manner somewhat analogous to the teeth of a rip-saw, while all of the teeth 31 of the sprocket 23 are arranged on a slant or diagonal with respect to the sides of said sprocket. The slanting teeth 31 of the sprocket are equally spaced and are parallel to one another; hence if all the teeth of rack 15 were unbent and in the flat vertical plane of said rack, they would all engage the slanting teeth 31 of the sprocket at precisely the same points. However, the bent teeth 30 of rack 15, being out of vertical alignment with the plane of said rack, will necessarily engage a different portion of the slanting teeth of the sprocket. The extent of bending of the teeth 30 is made to coincide with the increment between the corresponding calibrations of the thermometer. Such adjustments may easily be made to fit any thermometer or other instrument, as required.

In Figs. 5 and 6 the invention is shown as applied to a circular toothed wheel or rack driven by a driving pawl and retained by a holding pawl. In this embodiment a wheel 30 is provided with teeth 31 which are engaged at their bases by a driving pawl 32 pivoted to an arm 33 which is actuated by suitable means such as an electromagnet (not shown). The wheel is held in selected positions by a holding pawl 35 which is pivoted at 36 and is spring-pressed by a spring 37 to engage the teeth 31 near their crowns. The holding pawl 35 is provided with an inclined engaging edge 38. The wheel 30 is spring-pressed or otherwise held against the edge 38 of the holding pawl 35.

In the operation of this embodiment the teeth 31 may be variously bent as shown in Fig. 6 to engage the edge 38 of the holding pawl 35 at different points, thereby providing individual adjustments of the different steps in a manner similar to that illustrated in Figs. 1 to 4.

In the embodiment of Figs. 7 and 8 the invention is shown as applied to a pawl-actuated, straight rack 40 having teeth 41 engaged and actuated by a pawl 42, pivoted to a lever 43 which is driven by suitable means such as an electromagnet (not shown). In this form the edge 44 of the pawl 42 is inclined and the teeth 41 are variously bent as requested for the above described individual adjustment. The rack 40 is held by a suitable friction drag in the stepped positions.

Although certain specific embodiments of the invention have been shown in detail, it is to be understood that the invention may be applied to other uses and that changes and adaptations may be made therein as will be apparent to a person skilled in the art. The invention is only to be limited in accordance with the scope of the following claims.

What is claimed is:

1. In combination, a rack having teeth and a driving pawl successively engaging said teeth at a point spaced above their respective bases for feeding said rack step-by-step, said pawl having an inclined tooth engaging surface, said teeth being narrower than said pawl and being variously set with respect to their bases to engage said inclined surface at different selected points, whereby different selected individual increments of movement are obtained.

2. In combination, a rack having teeth and a driving pawl successively engaging said teeth for feeding said rack step-by-step, and a holding pawl, said holding pawl having an inclined tooth engaging surface positioned to engage said teeth at a point spaced above their respective bases, said teeth being narrower than said holding pawl and being variously set with respect to their bases to engage said inclined surface at different selected points, whereby different selected individual increments of movement are obtained.

3. In combination, a rack having teeth and a pawl successively engaging said teeth at a point spaced above their respective bases, said pawl having an inclined tooth engaging surface, said teeth being narrower than said pawl and being variously set with respect to their bases to engage said inclined surface at different selected points, whereby different selected individual increments of movement are obtained.

WILLIS ROBERT DRESSER.

REFERENCES CITED

The following references are of record in the file of this patent:

UNITED STATES PATENTS

| Number | Name | Date |
| --- | --- | --- |
| 143,538 | Smith | Oct. 7, 1873 |
| 1,700,361 | Asbury | Jan. 29, 1929 |
| 2,024,115 | Schwartz | Dec. 10, 1935 |
| 2,151,191 | Crane | Mar. 21, 1939 |
| 2,419,487 | Dresser | Apr. 22, 1947 |